Figure 1:
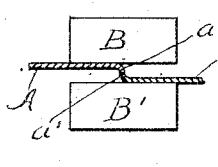

A. F. RIETZEL.
METHOD OF FORMING JOINTS IN METAL.
APPLICATION FILED OCT. 2, 1906.

1,005,880. Patented Oct. 17, 1911.

WITNESSES:
A. Kirchner Jr.
Lillian Blonde

INVENTOR
Adolph F. Rietzel
BY
Townsend & Decker
ATTORNEYS

UNITED STATES PATENT OFFICE.

ADOLPH F. RIETZEL, OF LYNN, MASSACHUSETTS, ASSIGNOR, BY MESNE ASSIGNMENTS, TO THOMSON ELECTRIC WELDING COMPANY, OF LYNN, MASSACHUSETTS, A CORPORATION OF MASSACHUSETTS.

METHOD OF FORMING JOINTS IN METAL.

1,005,880.  Specification of Letters Patent.  Patented Oct. 17, 1911.

Application filed October 2, 1906. Serial No. 337,137.

*To all whom it may concern:*

Be it known that I, ADOLPH F. RIETZEL, a citizen of the United States, and a resident of Lynn, in the county of Essex and State of Massachusetts, (with post-office address, Lynn, Massachusetts,) have invented certain new and useful Improvements in Methods of Forming Joints in Metal, of which the following is a specification.

My invention relates to methods of forming joints in metal work and has for its object to provide a method whereby one piece of metal may be united to another by a perfectly tight and homogeneous union and in a simple, cheap and effective manner.

My invention is especially useful in forming joints in sheet metal, although it may be employed in uniting pieces of metal to one another in cases where one or both of the pieces are of heavier gage or thickness than would be ordinarily included under the term "sheet metal."

A large field of utility for my invention is found in the manufacture of household utensils, in which field it may be employed, among other things, in uniting the handles or spouts of sheet metal ware to the body of the utensil.

Briefly stated, my invention consists in the improved method of forming a joint in metal work by providing one or both of the pieces of metal to be united with an upturned edge, abutting the edge of the upturned portion against the portion of the opposite piece with which the union is to be formed, applying pressure in the general direction of the plane of the upturned portion and passing heating electric current through the material in the general direction of the applied pressure.

Another part of my invention consists in uniting pieces of metal together on planes which, generally speaking, are transverse to one another, by providing the one piece with a flange formed with a contacting projection or projections, abutting the projections upon the metal surface with which union is to be formed, applying pressure to the flange in a line transverse to the plane of said flange and passing heating electric current through the metal in the direction of the pressure.

My invention further consists in an improved method of securing a sheet metal tube to a metal surface by providing the end of the tube with an annular flange having one or more contacting projections extending from the flange transversely to the plane thereof, abutting said flange with its projections against the metal surface with which union is to be made, applying pressure to the flange in a line transverse to the plane of said flange and passing heating electric current through the flange in the direction of the pressure.

My invention consists further in the special detailed modifications or variations of the process as more particularly hereinafter described and specified in the claims.

Figure 2:
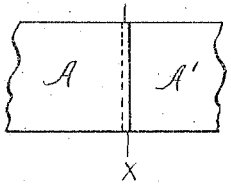
Figure 3:
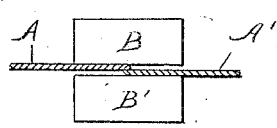
Figure 4:
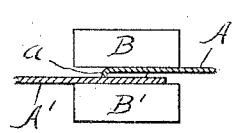
Figure 5:
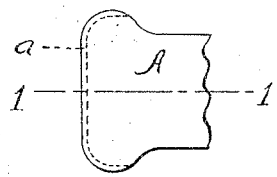
Figure 6:
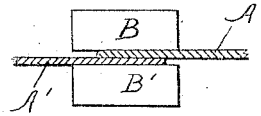
Figure 7:
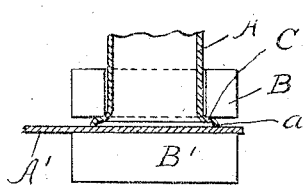
Figure 8:
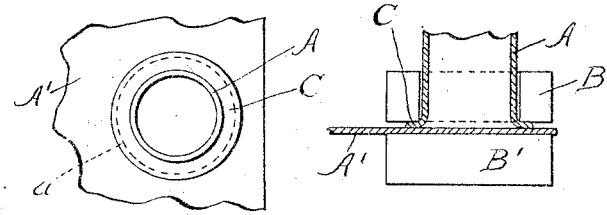
Figure 9:
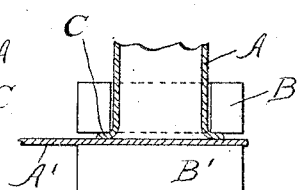
Figure 10:
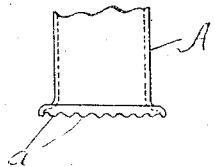
Figure 11:
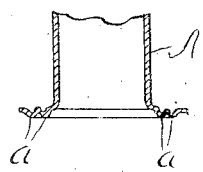

In the accompanying drawings, Figure 1 shows in section two pieces of metal adapted for union by my improved method and in place in a pressure applying and current supplying device. Fig. 2 shows the same two pieces in plan view. Fig. 3 shows the pieces at the completion of the process in horizontal section. Fig. 4 shows in section two pieces of metal, one of which only is especially prepared for union to the other and in place between the pressure applying and current supplying device. Fig. 5 is a plan of the prepared piece. Fig. 6 shows the two pieces after the completion of the process and in a section on the line 1, 1, Fig. 5. Fig. 7 illustrates the application of my invention to uniting the metal tube at its end to another piece of metal. Fig. 8 is an end view of the tubular piece. Fig. 9 shows two pieces of metal at the completion of the process. Fig. 10 is a side elevation showing modifications in the form of the upturned edge of the flange. Fig. 11 illustrates a modification suitable for use in the attachment of metal tubes and other metal bodies as in the case of spouts fastened to the bodies of sheet metal utensils.

In the various figures of the drawings, B and B' indicate pressure blocks or pieces of any machine adapted to apply pressure to the work when located between them and also adapted to supply a heating electric current which will pass from one of said blocks or electrodes to the other for the purpose of bringing the work to the desired plastic or welding condition. As there are many forms of machine which might be employed and as the form or shape of the blocks may be varied at will and according to the nature of the work, the same will not be described any further in detail.

In Figs. 1 and 2 the work is shown as consisting of two pieces of metal A, A' to be united end to end. One or both of said pieces preparatory to the actual welding operation is provided with an upturned edge $a$ or $a'$ adapted when the pieces of metal are inserted, as shown in Fig. 1, between the pressure and current supplying devices B, B', to abut at the edge of its upturned portion against the opposite piece or against the edge of a similar upturned portion on the other. In the case of sheet metal, this upturned edge may be obviously provided by deforming or bending the metal while in the case of heavier pieces of metal it may be provided in other ways. The line of the upturned edge is on the line $x$, $x$, Fig. 2. Said upturned edge might be, as indicated in the case of the tubular piece Fig. 10, serrated or so formed as to engage the surface to which it is applied on a number of points, thereby localizing the heating by the electric current in the initial stages of the operation. Said piece or pieces having been placed in position as shown in Fig. 1 between the blocks B, B' pressure is applied in the general direction of the plane of the upturned portion of the edge of A or A' and heating electric current in sufficient amount is passed from one block B to the other B' or vice versa, thus heating the projection or projections $a$, $a'$ to welding temperature, the final result being by the combined application of the pressure and heating current that two pieces are firmly united along the line 1, 1, Fig. 2 and as indicated in Fig. 3.

In the modification shown in Figs. 4, 5 and 6, one of the pieces A only is provided with the upturned edge $a$ and such upturned edge may extend around to the side of the piece A as shown more clearly in Fig. 5. In this case the piece A may represent the handle of a sheet metal household utensil which is to be united to the body of the utensil, the edge portion of which body is indicated at A'. A completion of the operation in the manner already described results in the union of the one piece to the other with the surfaces in close contact and with a complete union along the line of the upturned edge of the piece A.

In Figs. 7, 8 and 9, the one piece A is shown as tubular. This tubular portion may be a hollow handle of a sheet metal utensil or might be a spout. The opposite piece A' may be the body of the utensil at the point where the union is to be effected. In this case the piece A, whose general plane is transverse to the plane of A' is provided with a flange C which, in the case of a tube A, would be an annular flange. The flange C is provided with an upturned edge $a$ preparatory to its insertion into the machine and said upturned edge $a$ being abutted against the piece or sheet A', pressure is applied by the suitably formed pressure block B as indicated by the arrow in a line transverse to the plane of the flange and in the general direction of the upturned portion of the edge of the flange, heating electric current being passed also from one block or piece B to the opposite block or piece B' as already explained; the final result of the pressure and heating is the formation of the union or metal joint between A and A' and as illustrated in Fig 9. Obviously, the upturned edge $a$ instead of being continuous might be interrupted or serrated as indicated in Fig. 10.

In those cases where it is desired to fasten a sheet metal tube to a sheet metal body, as for instance, a spout to the body of a sheet metal utensil, the contacting projection instead of being an upturned continuous or discontinuous edge of the flange as already described may, as illustrated in Fig. 11, consist of a series of projections or indentations formed in the surface of the flange itself or might be a continuous or annular projection formed in said flange.

What I claim as my invention is:

1. The improved method of forming a joint in metal work by providing one of the pieces of metal to be united with an upturned edge projecting transversely to the plane of the piece to which it is to be jointed, abutting the edge of the upturned portion against the portion of the opposite piece with which the union is to be formed, applying pressure in the general direction of the plane of the upturned portion and passing heating electric current through the upturned edges in the general direction of the applied pressure.

2. The method of forming a joint in sheet metal by upturning an edge of a metal sheet, abutting the edge of the upturned portion transversely against a plane surface of the piece with which the union is to be formed, applying pressure in the general direction of the plane of the upturned portion and passing heating electric current through the up-turned edge in the direction of the pressure.

3. The method of forming a joint between two pieces of sheet metal, consisting in forming an upturned edge on one of said pieces, placing an upturned edge of one piece in engagement with the other piece and transversely to the plane of said piece, pressing the pieces together in the general direction of the plane of the upturned portion and passing heating electric current through the up-turned edge in the direction of such pressure.

4. The herein described method of uniting two pieces of metal together in planes transverse to one another, consisting in providing one of said pieces with a flange formed with a contacting projection, abutting the projection of said flange upon the metal surface with which union is to be formed, applying pressure to the flange in a line transverse to the plane of the flange and passing heating electric current through the projection of the flange in the direction of such pressure.

5. The method of securing a sheet metal tube to a metal body by providing the end of the tube with an annular flange, having contacting projections projecting transversely to the plane of the flange, applying the flange to the surface with which union is to be formed, passing heating electric current through the contact projections and subjecting the parts to mechanical pressure applied in a direction transverse to the plane of the flange.

6. The herein described method of securing a sheet metal tube to a sheet metal body by providing the end of the tube with an annular flange having an upturned edge, applying the flanged edge to a plane surface of the body with which union is to be made and with the upturned edge in contact therewith and then passing an electric current through the up-turned edge and the sheet metal body with which it is in contact and subjecting the parts to pressure applied in a direction transverse to a plane of the flange.

Signed at Lynn, in the county of Essex and State of Mass. this 14th day of Sept. A. D. 1906.

ADOLPH F. RIETZEL.

Witnesses:
ADA J. NICHOLS,
ARTHUR L. USHER.